United States Patent Office.

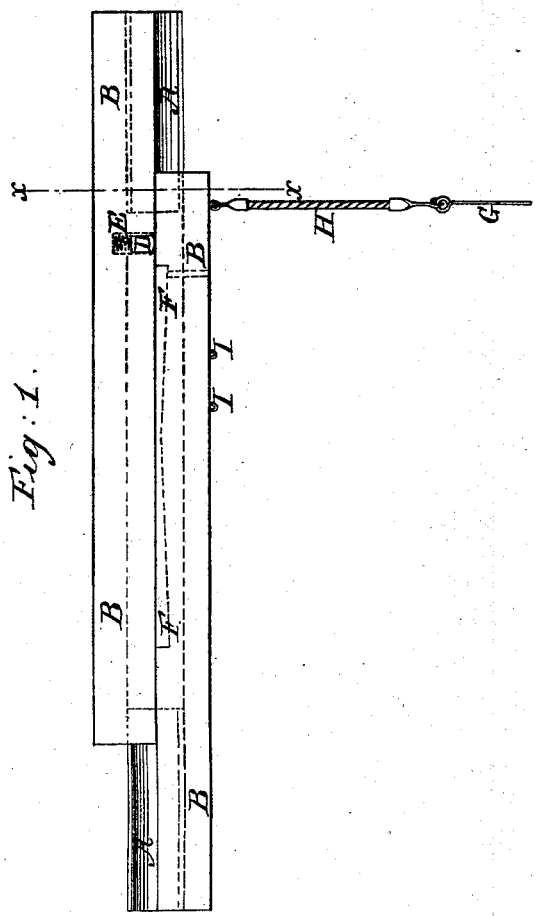

H. OLDS, OF SYRACUSE, NEW YORK.

Letters Patent No. 68,782, dated September 10, 1867.

IMPROVED SLIDE FOR EXTENSION-TABLES.

*The Schedule referred to in these Letters Patent and making part of the same.*

TO ALL WHOM IT MAY CONCERN:

Be it known that I, H. OLDS, of Syracuse, in the county of Onondaga, and State of New York, have invented a new and useful improvement in a Slide for Extension-Tables; and I do hereby declare that the following is a full, clear, and exact description thereof, which will enable others skilled in the art to make and use the same, reference being had to the accompanying drawings, forming part of this specification.

Figure 1 is a side view of the slide-bars with my improved slides attached.

Figure 2 is a cross-section of the same taken through the line $x\ x$, fig. 1.

Similar letters of reference indicate corresponding parts.

My invention has for its object to furnish an improved slide for extension-tables, simple in construction, easily applied, and effective in operation; and it consists in the cross-shaped slide, the wings of which are at right angles to each other; in the combination of the cross-shaped slides with grooves inclining at right angles with each other from the same opening in the faces of the slide-bars; and in the combination of a stop-bolt, coiled spring, and inclined groove or grooves with the faces of the adjacent bars; the whole being constructed and arranged as hereinafter more fully described.

A are the slides, which are made in the form of a cross in their cross-section, the wings of which are at right angles to each other, and which may be made of any desired length or breadth. The slides A are placed in grooves formed in the contiguous faces of the slide-bars B. The said grooves, starting from the same opening in the centre of the faces of the said bars, separate or incline from each other, so that their planes may be at right angles to each other, as shown in fig. 2. The slides are placed in the opposite ends of the adjacent bars, and are secured in place by the stay-pins or screws C, which pass through the wings of the slides A, as shown in fig. 2, so as to hold the said slides securely in place. One or more stay-pins or screws C may be used with each slide, as may be desired. This construction of the slides A and of the grooves in the bars B greatly simplifies and cheapens the construction of the said slides and bars, as the grooves can be sawn in the said bars, allowing each bar to be made in one piece. The labor of finishing the slides is also very much diminished, while, at the same time, the slides thus constructed are very effective and easily operated. D is a stop-bolt placed in a cavity or hole formed in the face of one of the slide-bars B, near its end, and which is pressed out by the elasticity of the coiled spring E placed in the bottom of said cavity or hole. F are inclined grooves, formed in the face of the other bar B, the ends of which grooves that are towards the ends of the bar are deepest, and terminate in a square shoulder or stop. The inner or shallower parts of the said grooves may be continued till they meet each other, if desired, so as to form a continuous groove. This spring-stop bolt and inclined groove or grooves hold the sliding-bars locked, so that they can neither be pushed too far in nor drawn too far out. The bars B may be unlocked by means of the key G, which may be connected to the side of one of the bars by a chain or elastic cord, H, and which, when not in use, may be placed in the keepers I attached to the side of the said bar.

By passing the key G into a small hole in the side of the bar, and pressing it against the end of the stop-bolt D, the said bolt may be forced into the cavity in which it is placed so as to allow the bars B to be drawn apart.

I claim as new, and desire to secure by Letters Patent—

1. The combination of the stay-pins C, the cross-shaped slides A, and slide-bars B, substantially as and for the purpose specified.

2. The combination of the stop-bolt D, coiled spring E, and inclined groove or grooves F, with the sliding-bars B, substantially as herein shown and described, and for the purpose set forth.

3. The combination of the key G with the stop-bolt D, coiled spring E, and groove F, substantially as herein shown and described, and for the purpose set forth.

H. OLDS.

Witnesses:
A. T. KNAPP,
J. W. TEFFT.